United States Patent [19]

Bergstedt

[11] Patent Number: 4,855,752
[45] Date of Patent: Aug. 8, 1989

[54] METHOD OF IMPROVING DOT-ON-DOT GRAPHICS AREA-FILL USING AN INK-JET DEVICE

[75] Inventor: Donald B. Bergstedt, Escondido, Calif.

[73] Assignee: Hewlett-Packard Company, Palo Alto, Calif.

[21] Appl. No.: 256,174

[22] Filed: Oct. 11, 1988

Related U.S. Application Data

[63] Continuation-in-part of Ser. No. 57,130, Jun. 1, 1987, abandoned.

[51] Int. Cl.$^4$ .......................... G01D 15/16; B41J 3/04
[52] U.S. Cl. ................................ 346/1.1; 346/140 R; 358/75
[58] Field of Search .......................... 346/1.1, 75, 140; 358/75

[56] References Cited

U.S. PATENT DOCUMENTS

| | | | |
|---|---|---|---|
| 4,178,597 | 12/1979 | Isayama | 346/75 |
| 4,320,406 | 3/1982 | Heinzl | 346/140 |
| 4,367,482 | 1/1983 | Heinzl | 346/140 |
| 4,528,576 | 7/1985 | Koumura | 346/140 |
| 4,540,996 | 9/1985 | Saito | 346/140 |

*Primary Examiner*—Joseph W. Hartary
*Attorney, Agent, or Firm*—William J. Bethurum

[57] ABSTRACT

Perceived quality of printing dot-on-dot graphics area fill using an ink-jet device is improved by printing swaths (30, 32, 34, 36, 38) of alternating colors, with each swath offset from the preceding swath by a predetermined amount. In this manner, banding (22, 22'), which is perceived with prior art printing methods, is substantially reduced.

16 Claims, 4 Drawing Sheets

METHOD OF IMPROVING DOT-ON-DOT GRAPHICS AREA-FILL USING AN INK-JET DEVICE

CROSS-REFERENCE TO RELATED APPLICATION

This application is a continuation-in-part application of copending application Ser. No. 07/057,130, filed June 1, 1987, now abandoned.

TECHNICAL FIELD

The present invention relates to ink-jet devices for printing colors on a print medium, and, more particularly, to a method of improving the perceived quality of color graphics thereon.

BACKGROUND ART

Ink-jet devices fire droplets of ink toward a printing medium, such as paper or Mylar. Typical ink-jet printheads comprise at least one group of nozzles, called a primitive, through which the droplets of ink are fired. For full color printing, three primitives are employed, with the nozzles of each fluidically connected to a reservoir of a different color ink (cyan, yellow, magenta). The firing, or propelling of ink droplets, may be done by piezoelectric means or by resistive heating (thermal).

In green, red and blue solid area-fill, the colors are generated by placing one dot of a first color on top of another dot of a second color, which produces the desired third color (e.g., yellow on cyan creates green). In the normal printing mode, the dots are put down on each other in the same pass of the printhead across the medium.

In one prior art U.S. Pat. No. i.e., 4,320,406, a printer utilizes adjacent nozzles 80 of primary colors magenta (M), yellow (Y), and cyan (C), with the color primaries adjacent one another; cf. FIG. 3 herein. This arrangement does not allow the primaries to overlap, and the patent makes no claim as to the quality of its product. The inventor used the layout to reduce the number of heads being accelerated and decelerated and also to minimize the space required. Without overlap, a larger head is needed; if three colors are used, two extra swaths are required at the beginning and end of an image, and if four colors are used, three extra swaths are required at the beginning and end.

In another prior art U.S. Pat. No. i.e., 4,540,996, the print method employs nozzles grouped in primitives, or printheads 90A, B, C and D, but the nozzles within each primitive or printhead 93 are not adjacent, where "adjacent" means "placed at one dot intervals or row from each other". One dot row is the distance defined by the printer resolution. For example, a 300 dot per inch printer has dot rows that are 1/300 inch (0.00333 inch) apart. Adjacent nozzles, then are 1/300 inch, or one dot row apart. Thus, for an equal number of nozzles, the printhead must be larger in the prior art printer; cf. FIG. 4 herein.

The configuration presented by FIG. 3 of the patent (FIG. 4 herein) will produce different hues. The configuration of FIG. 6 in the patent requires five extra swaths, or scans, at the beginning and end of a color image. The configuration of FIG. 10 in the patent requires six extra swaths at the beginning and end of a color image. As a result, the patented system requires more time and a larger printhead than the present method with an equal number of nozzles.

When printing a block of area-fill, bands occur between swaths of print rows, a swath being what is printed during a pass of the printhead or printheads across the medium by multiple nozzles one dot apart. The bands are caused by absorption of the first color printed on the medium, which may be a specially coated paper used for color ink-jet printing. The banding tends to reduce the perceived quality of the output.

Accordingly, a method of producing a substantially uniform block of color, without the perceived banding or at least with reduced perceived banding is desired.

DISCLOSURE OF INVENTION

In accordance with the invention, a method of forming dot-on-dot graphics area-fill with reduced perceived banding is provided. The method comprises overlapping a portion of one print row with a portion of another print row.

More specifically, the method of the invention comprises:

(1) printing a first swath of a first color;

(2) printing a second swath of a second color offset from the first swath by a predetermined amount, wherein the offset direction is perpendicular to the printhead scan direction or in the medium index direction; and (3) printing subsequent swaths of alternating first and second colors offset from preceding swaths by the predetermined amount, until the entire area is filled.

The offset printing may be done by moving either the print medium or the printhead relative to the other. Also, primitives on the printhead may be staggered to achieve the desired effect.

By overlapping, or interleaving, swaths of the individual colors, the bands present in the conventional print mode are eliminated. This results in improved print quality and homogeneity of graphics output.

BEST MODES FOR CARRYING OUT THE INVENTION

Figure 1:
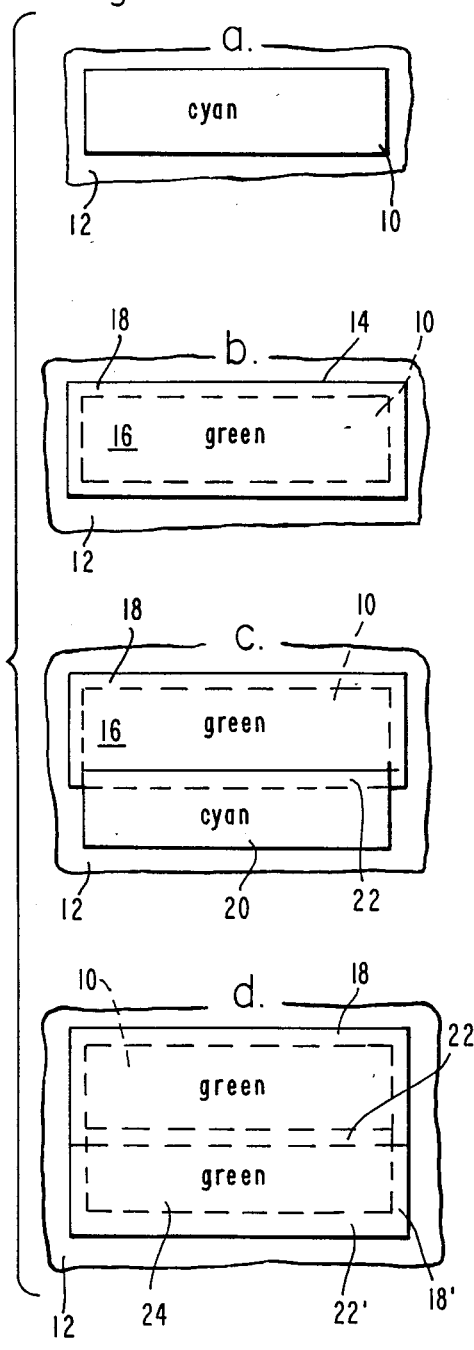
FIGS. 1a–d are top plan views of printing two colors to achieve a third color, employing a conventional print mode used in the prior art.

Referring now to the drawings wherein like numerals of reference designate like elements throughout, FIGS. 1a-d depict the sequence of events in filling in an area of a third color achieved by printing multiple swaths of two colors. In the description which follows, the color green is achieved by printing alternating swaths of cyan and yellow. However, it will be understood that other combinations suffer from the same effect to be described, and that such other combinations will also benefit from employing the method of the invention.

FIG. 1a illustrates the printing of a first swath 10 of a first color, here, cyan, on a print medium 12. Employing ink-jet technology, the swath 10, and subsequent swaths, are generated by firing all nozzles of a primitive on the printhead. As an example, a primitive may contain ten nozzles, although fewer or greater numbers of nozzles may be employed.

In FIG. 1b, a swath 14 of a second color, here, yellow, is overlaid directly over the first swath 10, either in the same pass across the medium 12 or in a subsequent pass. However, the print medium 12 is saturated with the first color, so the second color tends to run off the first color, creating the third color in the central portion 16 and a border 18 of the second color.

In FIG. 1c, a second swath 20 of the first color is printed, and its top edge is aligned substantially adjacent the bottom edge of the first swath 10 of the first color. While that portion 22 of the border 18 overlaid by the second swath 20 suffers from the saturation effects discussed in connection with FIG. 1a, it nevertheless is converted to the third color. However, whereas the central portion 16 comprises the second color on top of the first color, the border portion 22 comprises the first color on top of the second color. This distinction will be discussed shortly.

In FIG. 1d, another swath 24 of the second color is overlaid directly over the second swath 20. Again, due to saturation of the print medium, the third color is generated in the central portion 16', and a border 18' of the second color is formed, as in FIG. 1b.

It will be appreciated that printing of subsequent swaths of the first color overlaid with swaths of the second color generates two regions of a third color, namely a central portion 16 (and 16', etc.) and a border portion 22 (and 22', etc.). While both are of the same color, the former region is a third color of the cast of the first color (due to the prior absorption of the first color therein), while the latter region is a third color of the cast of the second color (due to the prior absorption of the second color therein).

Thus, in the case of swaths 10, 20 of cyan overlaid with swaths 14, 24 of yellow, the central portions 16, 16' are green with a bluish cast, while the border portions 22, 22', are green with a yellowish cast. The resulting area-fill comprises large swaths of one shade of green separated by narrow bands of another shade of green. The distinct banding is considered objectionable.

In accordance with the invention, the perceived quality of the area fill is improved by overlapping, or interleaving, swaths of the individual colors. The preferred sequence of the overlapping is depicted in FIGS. 2a-e.

FIG. 2a shows a first swath 30 of a first color, again, cyan, for example, printed on a medium 12. A complete first swath is printed. Region "A" comprises the first color.

In FIG. 2b, only a portion of a second swath 32 of a second color, again, yellow, for example, is printed, offset from the first swath by a specific, predetermined amount. The portion (region "A'") not printed by the second color relates to the amount of overlap, or offset, and here is one-half of a swath. Thus, one-half swath is initially printed, and the offset is one-half swath, so that the second swath 32 covers the top one-half of the printed portion of the first swath 30. The swath 32 creates the third color, again, green, for example, while the bottom half of the swath 30 remains the first color. Region "B" is now the third color, while that portion of region "A" not printed on is denoted "A'".

In FIG. 2c, a second swath 34 of the first color is printed adjacent the swath 30, again, offset from the second swath 32 by the predetermined amount, here, onehalf swath. Thus, the top of swath 34 butts against the bottom of swath 30. Region "B", being unaffected in this step, remains the third color, region "A'", also unaffected, remains the first color, and region "A" is the newly-printed first color.

In FIG. 2d, a second swath 36 of the second color is printed, offset from the swath 34 by the predetermined amount, again, one-half swath. Region "B", being unaffected in this step, remains the third color, region "A'" and the upper portion of region "A" are now the third color, as denoted by "B", and the lower portion of region "A" not printed on is denoted "A'", the first color.

The method may be continued as many times as desired, printing of swaths of alternating first and second colors, until the area is filled. In order to terminate the last swath of the area to provide only one color, only a portion of the last swath is printed, and is the amount of offset, here, one-half of a swath 38, as shown in FIG. 2e.

It will be appreciated that in the preferred embodiment, one color (the first color, here, cyan) is always overlaid by another color (the second color, here, yellow), so that the resulting third color is always of the same cast. Thus, the objectionable banding achieved with the prior art method is avoided.

Figure 3:
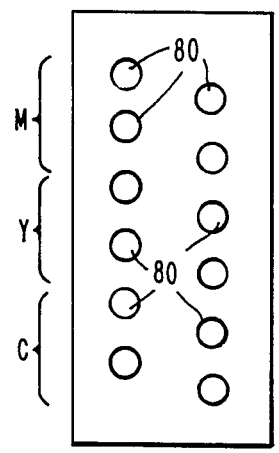
FIG. 3 is a front view of an ink-jet plate for an ink printing head in accordance with U.S Pat. No. 4,320,406.
Figure 4:
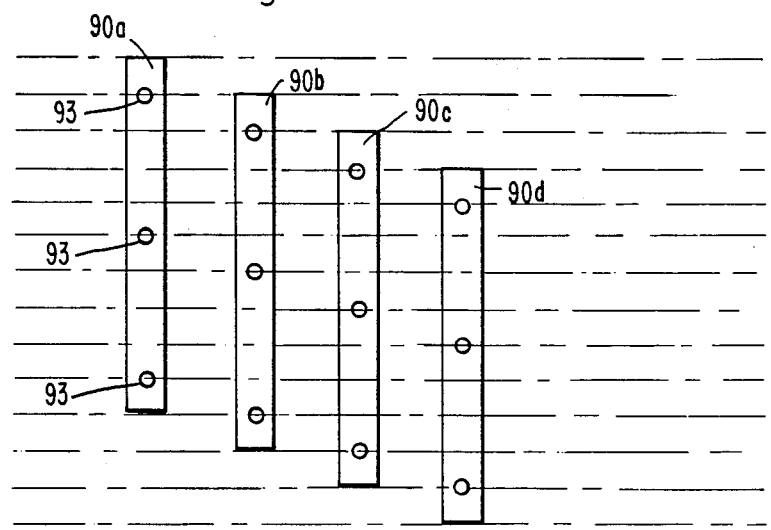
FIG. 4 is a configuration of a recording head unit in accordance with U.S. Pat. No. 4,540,996.

The offsetting of one color relative to another color can be done using several methods. FIGS. 3 and 4 represent prior art approaches and have been explained above under BACKGROUND ART.

Figure 5:
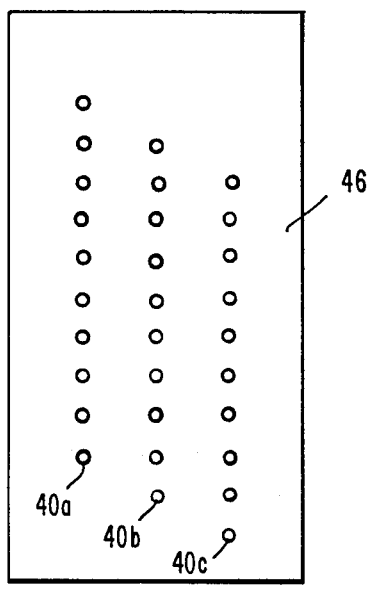
FIG. 5 is a front view of an ink-jet plate which can be used in one method of the present invention.

FIG. 5 illustrates a method of carrying out the invention. Individual primitives 40, 42, 44 on a single printhead containing separate colors can be physically offset relative to each other.

Figure 6:
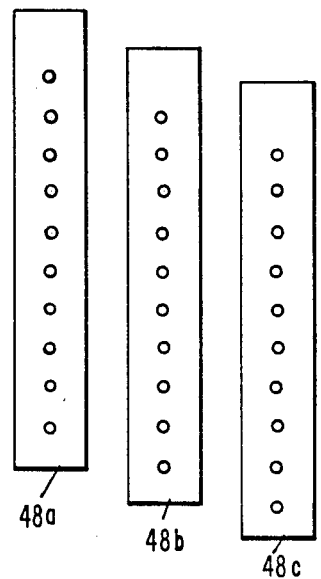
FIG. 6 is a front view of an arrangement of the inkjet plate using separate pens, in accordance with the present invention.

FIG. 6 illustrates a second method. If the primary colors are contained in separate printheads 48a, 48b, 48c, the printheads themselves can be offset relative to one another.

Figure 7:
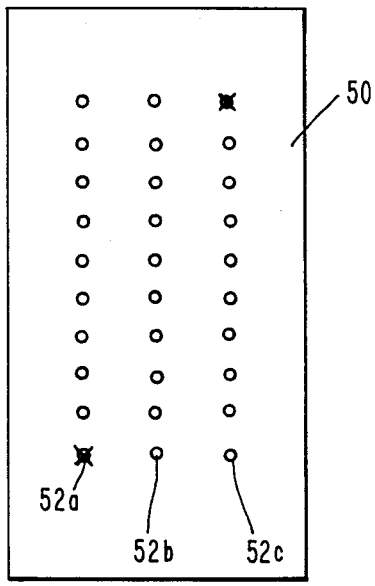
FIG. 7 is a front view of still another ink-jet plate which can be used in accordance with the present invention.

FIG. 7 illustrates a third method, which uses a printhead 50 having primitives 52a, 52b, 52c, which are not offset (or with a printhead fixturing configuration not having the printhead offset); less than the full number of nozzles in each primitive, or printhead, can be used in order to allow for offsetting of the remaining nozzles. In the process illustrated in FIG. 7, C1 and Y10 are omitted and the index medium is nine dot rows. More nozzles can be omitted. For instance, if C1, C2, C3 and Y8, Y9, Y10 are omitted, then the medium index would be seven dot rows. The nozzles in each primitive in FIGS. 5, 6, and 7 are located one dot apart in the medium scan direction.

Figure 8A:
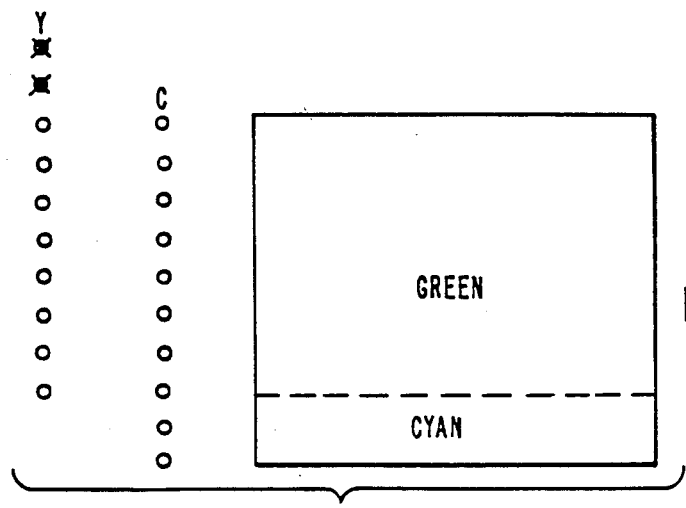
FIGS. 8a, 8b, and 8c illustrate one method of carrying out the present invention.
Figure 8B:
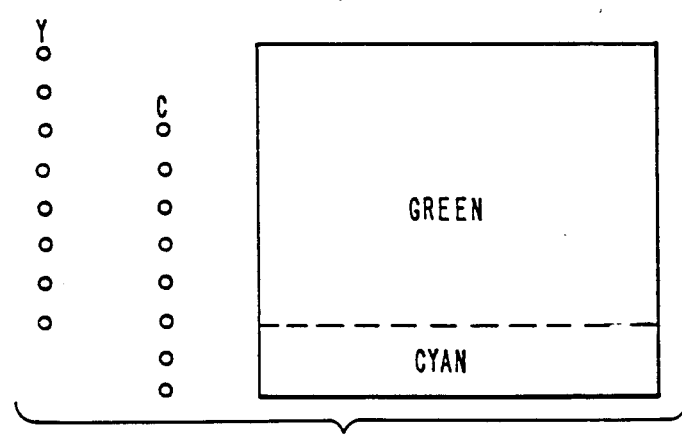

FIG. 8 illustrates the use of varying numbers of nozzles. In FIG. 8a, the first swath uses nozzles 3-10 of yellow and all the cyan nozzles 1-10. On a second swath, FIG. 8b, all the nozzles of both colors are used. In the last swath, all the yellow nozzles 1-10 and nozzles 1-8 of cyan are used.

Figure 8C:
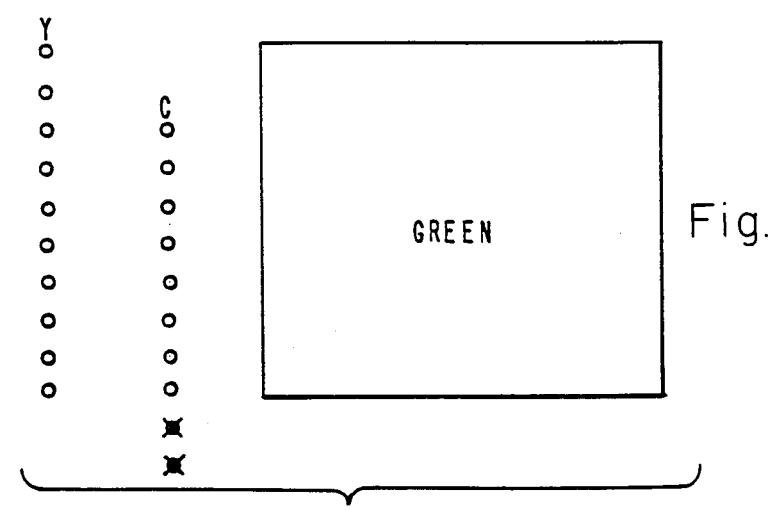

The third method, FIG. 8c, allows for offsetting without having to make a physical change to an existing printhead or to the printhead fixturing (in the case when each color is in a separate printhead).

Figure 2:
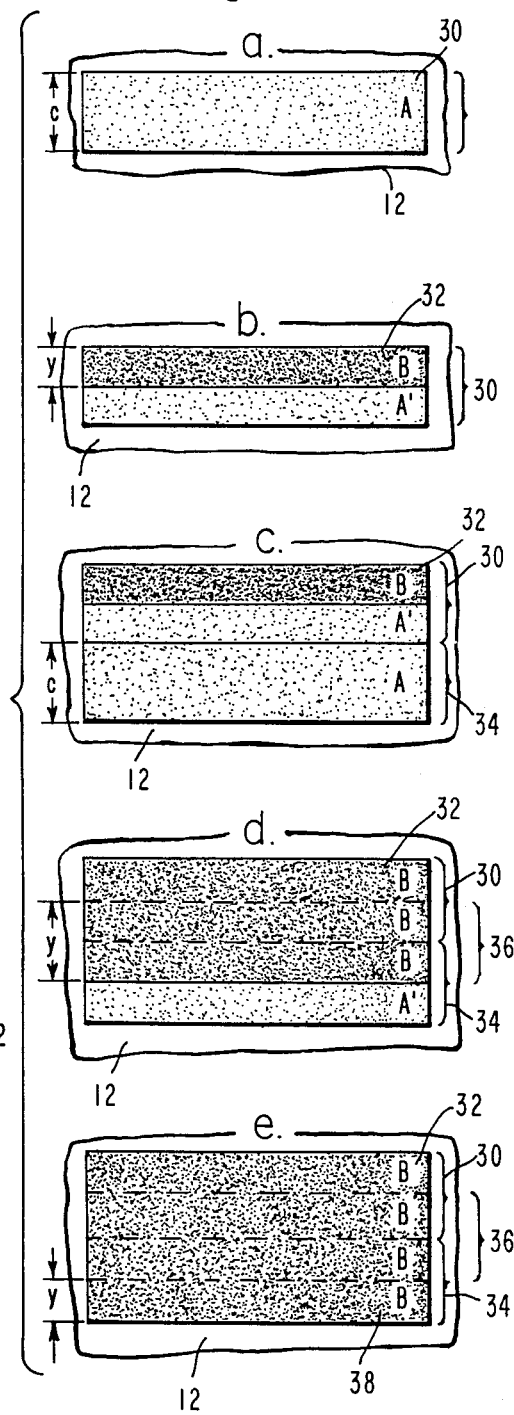
FIGS. 2a–e are top plan views of printing two colors to achieve a third color in accordance with the invention.

By physically offsetting the nozzles of one color relative to the nozzles of the other color using any of the methods stated previously, the two colors can be deposited during the same pass of the printhead across the medium. In FIG. 2, this would be accomplished by depositing the swaths 30 and 32 represented in FIGS. 2a and 2b in the same pass, as well as the swaths 34 and 36 represented in FIGS. 2c and 2d during the same pass.

Two additional methods can be used to create the offset of the two colors. In the fourth method, the print medium 12 can be moved relative to the printhead. In the fifth method, the printhead can be moved relative to the print medium 12. These methods require that the medium or printhead, depending on which is being moved, move backward (opposite the direction of the progression of printing down the page) to allow for the offsetting of the second color relative to the first color. The printhead or medium must then be moved forward to deposit the first color on an unprinted section of medium again, then move backward to print the second color, and continue in this fashion until the area-fill block is complete. Thus, these methods require that one pass of the printhead across the medium be made for each primary color deposited.

The advantage of printing the first and second colors during the same pass of the printhead or printheads across the medium, as in FIGS. 8a, 8b, 8c, is that the time required to print a section of area-fill is approximately halved. However, with the offset configuration, the print quality is better when the section is printed in the twopass mode rather than in a single-pass mode. The reason for this is that one section of the third color is created by combining the first and second colors in the same pass, and another section is created by depositing the second color on top of the first color which was deposited in the previous pass of the printhead across the medium. The difference creates a variation in hue between the two sections, which is noticeable.

In the two-pass mode, the second color is deposited on two sections of the first color. One section was deposited in the previous pass, and the other was put down three passes prior to the pass of the second color. The two sections of the first color are very similar, since both have had sufficient time to dry, and result in a uniform area of the third color.

The extent of offset may be varied. In the one-pass mode, maximum print quality is achieved at an offset of 100%, while slight improvement is made with slight amounts of offset of at least one nozzle or one dot row. In the two-pass mode, maximum print quality is achieved at an offset of 100% also, but major improvements are obtained with slight amounts of offset of at least one nozzle or one dot row.

When the printhead has three or more rows of nozzles, the offset between rows that are not adjacent can exceed 100%.

Figure 9:
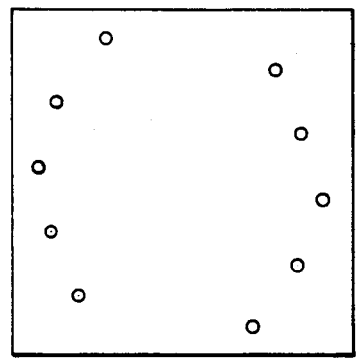
FIG. 9 illustrates an alternative arrangement of nozzles for one vertical row of nozzles in FIGS. 5, 6, or 7.

The nozzles in FIGS. 5, 6, and 7 are shown adjacent and in verticals. It is often required that nozzle positions vary along the printhead scan direction to accommodate ink delivery paths or for nozzle firing timing offsets needed by the printer electronics. This does not affect the present invention in any way, as long as the nozzles are one dot apart in the vertical or medium index direction as shown in FIG. 9.

INDUSTRIAL APPLICABILITY

The use of offset partial swath printing in accordance with the invention is expected to find use in color ink-jet printers.

Thus, there has been disclosed a method of improving dot-on-dot graphics area fill using an ink-jet device. It will be clear to one of ordinary skill in the art that various changes and modifications of an obvious nature may be made, and all such changes and modifications are considered to fall within the scope of the invention as defined by the appended claims.

What is claimed is:

1. An improved method or generating dot-on-dot graphics area fill on a print medium using an ink-jet device, said device including at least one printhead having a set of primitives, each primitive comprising a plurality of adjacent nozzles one dot apart fluidically connected to a reservoir of a given color, said method comprising:
    (a) printing a first swath of a first color by ejecting ink through said plurality of nozzles;
    (b) partially overprinting said first swath with a narrower swath of a second color such that part of said first swath is exposed as a partial swath of said first color, said overprinting being accomplished by ejecting ink through a second plurality of nozzles;
    (c) printing a second swath of said first color abutting said partial swath;
    (d) printing another swath of said second color over said partial swath and an adjacent portion of said second swath of said first color;
    (e) repeating steps (c) and (d) until said graphic area is completely colored; and
    (f) finally overprinting any remaining narrow swath of said first color with a partial swath of said second color.

2. The method of claim 1 wherein said partial swath of said first color is at least one nozzle wide.

3. The method of claim 2 wherein said predetermined amount comprises up to 100% offset.

4. The method of claim 2 wherein said partial swath of said first color comprises about one-half swath.

5. The method of claim 1 wherein said partial swaths are attained by moving said medium with respect to said printhead.

6. The method of claim 1 wherein said partial swaths are attained by moving said printhead with respect to said medium.

7. The method of claim 1 wherein said partial swaths are attained by staggering said primitives with respect to each other.

8. The method of claim 1 wherein said printing commences with printing said first swath, followed by printing said narrower swath of said second color, and terminates with printing said partial swath of said second color, such that the width of said narrower swath of said second color plus the width of said partial swath of said second color equal the width of one swath.

9. The method of claim 8 wherein said printing commences with printing the bottom one-half of said first swath and terminates with printing the upper one-half of said last swath.

10. The method of claim wherein said swaths of alternating first and second colors are printed in one pass of said at least one printhead across said print medium.

11. The method of claim 1 wherein said swaths of alternating first and second colors are printed in two passes of said at least one printhead.

12. An improved method of generating dot-on-dot graphics area fill on a print medium using an ink-jet device including at least one printhead having a set of primitives, each primitive comprising a plurality of nozzles one dot apart fluidically connected to a reservoir of a given color, said method comprising:
 (a) printing a first swath of a first color by ejecting ink through said plurality of nozzles associated with said first color;
 (b) overprinting approximately the top 50% of said first swath with a swath of a second color by ejecting ink through a second plurality of nozzles;
 (c) printing a second swath of said first color abutting said first swath;
 (d) printing another swath of said second color over approximately the lower 50% of said first swath and the top 50% of said second swath of said first color;
 (e) repeating steps (c) and (d) until said graphic area is completely colored; and
 (f) overprinting the remaining 50% of the last swath of said first color with a 50% swath of said second color.

13. The method of claim 12 wherein said swaths are located on said print medium by moving said medium with respect to said printhead.

14. The method of claim 12 wherein said swaths are located on said print medium by moving said printhead with respect to said medium.

15. The method of claim 12 wherein said swaths of alternating first and second colors are printed in one pass of said at least one printhead across said print medium.

16. The method of claim 12 wherein said swaths of alternating first and second colors are printed in two passes of said at least one printhead.

* * * * *